April 24, 1934.   P. H. CRAIG   1,956,121
STATIC SUPPRESSOR SYSTEM
Filed April 19, 1930
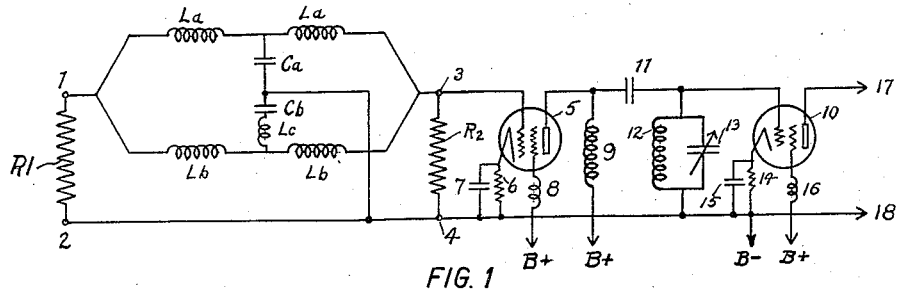
FIG. 1
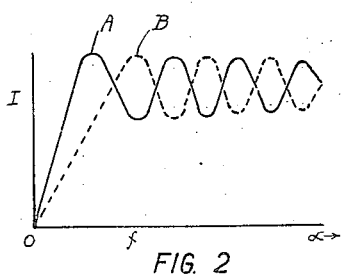
FIG. 2
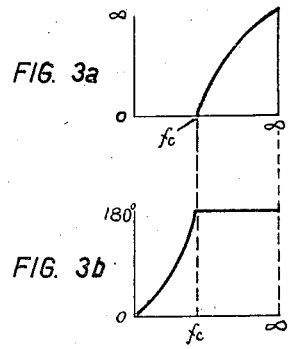
FIG. 3a
FIG. 3b
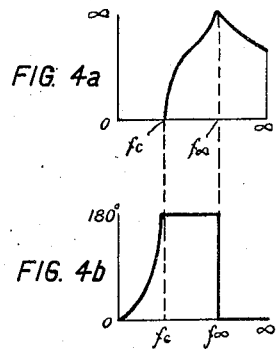
FIG. 4a
FIG. 4b
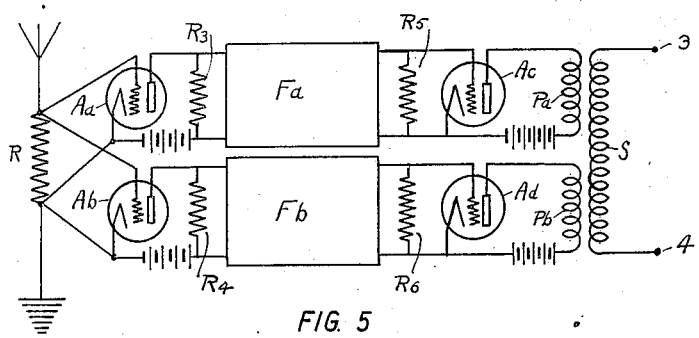
FIG. 5
Inventor
PALMER H. CRAIG
By Ralph B. Stewart
Attorney Patented Apr. 24, 1934

1,956,121

UNITED STATES PATENT OFFICE 1,956,121

STATIC SUPPRESSOR SYSTEM

Palmer H. Craig, Cincinnati, Ohio, assignor to Invex Corporation, a corporation of New York Application April 19, 1930, Serial No. 445,803

15 Claims. (Cl. 250—20)

This invention relates to a system for suppressing or minimizing the effects of static and similar electric disturbances upon signal receiving apparatus.

It is well known that static and similar electric disturbances are of a very complex nature and extremely variable, however, it has been discovered that disturbances due to static or atmospheric electricity possess what may be called a preponderating impulse frequency which, while varying in value, is normally lower than the frequency of the carrier wave in the range of ordinary broadcast frequencies. It is also known that static disturbances are sometimes due to the discharge of single electric impulses of either polarity and not having a definite frequency. These impulses produce shock excitation of receiving circuits and excite transient oscillations in any circuit of an oscillatory character.

An object of the invention is to devise a signal receiving system in which the oscillatory effect of static and similar disturbances is substantially suppressed and prevented from reaching the detecting apparatus.

A further object of my invention is to devise a receiving system which will discriminate between static impulses and the signal wave.

In carrying out the objects of this invention, I employ two transmission paths for connecting the antenna or wave collecting network with the wave detector, the two transmission paths being connected in parallel and having unlike characteristics such that the oscillatory transient effects of the static transmitted over the two paths substantially annul or neutralize each other.

My invention is illustrated in the accompanying drawing in which:

Figure 1 is a circuit diagram of one form of my invention;

Figure 2 shows two curves illustrating the indicial admittances of two wave filters;

Figures 3a and 3b are curves illustrating the attenuation and phase shift respectively of a constant K-type wave filter;

Figures 4a and 4b are curves illustrating the attenuation and phase shift respectively of a series-derived M-type wave filter, and Figure 5 illustrates a modified arrangement of my invention.

Referring to Figure 1, 1 and 2 are input terminals to which the antenna or wave collecting network (not shown) is to be connected, and 3 and 4 are a pair of output terminals to which is connected the input circuit of an amplifier tube 5. Between terminals 1—2 and 3—4 are connected two parallel transmission paths, one of which includes a low-pass constant-K type filter comprising series inductances $La$, $La$ and shunt condenser $Ca$, and the other path includes a low-pass series derived M-type filter comprising series inductances $Lb$, $Lb$, shunt inductance $Lc$, and shunt capacity $Cb$. $R1$ and $R2$ symbolize suitable terminating impedances connected across input terminals 1—2 and output terminals 3—4, respectively. The antenna-ground circuit or collecting network may be connected either directly to terminals 1—2, or indirectly to these terminals through a suitable terminating or equalizing network. It is understood that the terminating impedance $R1$ may be incorporated in the collecting network. The input circuit of amplifier 5 is connected across terminals 3—4, and includes a biasing resistance 6 connected in the negative side of the plate circuit and shunted by condenser 7 in the usual manner. The second grid and the plate of amplifier 5 are connected to suitable voltage taps on the plate supply source through inductances 8 and 9, respectively. The output circuit of amplifier 5 is connected to the input circuit of amplifier 10 by a series condenser 11 and a parallel tuned circuit including inductance 12 and a condenser 13. The input circuit of tube 10 also includes a biasing resistance 14 shunted by a condenser 15. The second grid of tube 10 is connected to a suitable point on the plate supply source through an inductance 16. The output terminals of amplifier 10 indicated at 17 and 18 lead to suitable detecting apparatus not shown. Tubes 5 and 10 are of the well known "screen-grid" type, but ordinary 3-element tubes may be employed if desired. One or more stages of selective radio frequency amplification may be included between tube 10 and the detector if desired.

The operation of my invention may be better understood by reference to Figure 2. The curve shown by the solid line A in this figure represents the indicial admittance of a low pass wave filter, that is, the ordinates of this curve represent the current flowing in response to a steady unit voltage applied across the terminals of a filter section at time $t=0$, the abscissæ representing time. It will be seen that the current first rises to a maximum value and then oscillates about a constant value K equal to the ultimate steady state current, the frequency of oscillation increasing with time and approaching the cut-off frequency of the filter as a limit. The amplitude of the oscillations decrease with time. This curve represents the transient or oscillatory effect produced in a wave filter when a voltage of a given value is suddenly applied to the input terminals of the filter. For a more detailed explanation of this curve and its dependence upon the constants of the filter, reference may be had to pages 124 to 126, of "Electric Circuit Theory and Operational Calculus" by John R. Carson, (1926).

The indicial admittance of a filter as represented in Fig. 2 may be defined as the current flowing in the output circuit of the filter, expressed as a time function, in response to a steady voltage of unit value impressed across the input terminals of the filter at time $t=0$. Expressed another way, the indicial admittance is the ratio of the output current, expressed as a time function, to the magnitude of the steady input voltage applied at time $t=0$.

The curve shown by the solid line A in Figure 2 represents approximately the oscillatory effect in the low pass filter $La$, $La$, $Ca$ in Figure 1 when a single static impulse is impressed upon the filter circuit. The constants of the filter $Lb$, $Lb$, $Lc$, $Cb$ are so adjusted that its indicial admittance is represented by the curve shown in the dotted line B in Figure 2, that is, the constants are so adjusted that the peaks in the dotted line curve B fall opposite the valleys in the solid line curve A, whereby the oscillatory effect produced in the first filter is substantially annulled by the oscillatory effect in the second filter. The effect, therefore, of a static impulse will be to impress across the output coupling impedance R2 a virtual direct current voltage maintained over a period of time sufficiently long to have very little influence on the radio receiving apparatus.

The indicial admittances of the two filters may be properly adjusted with respect to each other in a number of different ways: (a) the two filters may be of the same type, but with different cut-off frequencies; (b) the two filters may be of the same type and have the same cut-off frequencies, but with different numbers of sections in the two filters; (c) the two filters may be of different types and have the same or different cut-off frequencies. It is obvious that other combinations than those given above may be employed to produce the same result. In the diagram in Figure 1, I have shown a combination of a simple prototype or constant K filter and a series derived M type with different cut-off frequencies. I have obtained satisfactory operation with the arrangement shown in Figure 1 in which the values of inductances $La$ and $Lc$ are 0.675 millihenrys each, inductances $Lb$ 0.278 millihenrys each, and variable condensers $Ca$ and $Cb$ having a maximum capacity of 500 micro-micro-farads each; the inductances being measured at 700 kilocycles.

The filter arrangement connected between the antenna and amplifier 5 is not entirely perfect in operation, and certain static effects are transmitted towards the receiving apparatus by amplifier 5. In order to still further reduce the undesired effects of static passed on by amplifier 5 I have provided a special coupling circuit between this amplifier and the amplifier 10. It will be noted that the output circuit of amplifier 5 includes condenser 11 in series with the parallel tuned circuit 12—13, while the input circuit of vacuum tube 10 includes only the tuned circuit. The parallel tuned circuit is adjusted to resonate with the desired signal wave, and, therefore, offers extremely high impedance to this wave, the condenser 11 however, offering relatively low impedance to the signal wave. Conversely, for the relatively low frequency static impulses transmitted through amplifier 5, condenser 11 offers relatively high impedance, while the parallel tuned circuit 12—13 offers relative low impedance. Accordingly, the potential impressed upon the grid of tube 10 due to the signal wave is relatively much larger than the potential impressed upon the input circuit due to the static disturbance. While I have shown a condenser 13 connected in shunt to inductance 12 to form a tuned circuit, it is obvious that the condenser may be omitted, and the same discrimination will result but with less effectiveness. In case inductance 12 is employed without condenser 13, the natural frequency of the coil should be higher than the highest frequency in the band to be received. In practice, I have obtained satisfactory operation with the circuit shown in Figure 1 using a condenser 11 with a capacity of 500 micro-micro-farads, and a tuned circuit 12—13 capable of being tuned over the broadcasting band. The radio frequency choke coils 8 and 9 had values of 50 and 500 millihenrys, respectively; the tubes 5 and 10 being ordinary type 224 screen grid tubes. The biasing resistances 66 and 14 were 400 ohms each, and shunting condensers 7 and 15 of 0.1 micro-farads each. It will be understood that numerical values of the constants of the circuit of Figure 1 have been given above for the purpose of illustration only, and that such constants will vary with each modification or variation of my invention and will be determined by well known design principles. It is to be noted that condenser 11 serves an additional purpose of keeping the high direct current potential of tube 5 from biasing the grid of tube 10.

The operation of my static suppressor insofar as certain transient or oscillatory effects are concerned has been described above with reference to Figure 2. The operation of the system with respect to certain static effects which appear to approach a steady state condition may be explained with reference to Figures 3a, 3b and 4a, 4b. Figures 3a and 3b represent, respectively, the attenuation and phase shift characteristics of a constant K type filter, such as that shown in Figure 1 formed by inductances $La$, $La$ and condenser $Ca$. The ordinates in Figures 3a and 4a represent attenuation, and the ordinates in Figures 3 and 4b represent phase shift per filter section. The abscissæ in all four figures represent frequency. Referring to Figure 3a, it will be seen that from zero frequency up to the cut-off frequency $f_c$, the attenuation is zero, and beyond the cut-off frequency the attenuation of waves of higher frequency increases until at infinite frequency the attenuation is infinite. Referring to Figure 3b, the phase shift per section of the filter for steady state alternating currents is shown to increase with frequency from zero to 180° as the frequency increases from zero to the cut-off frequency of the filter. Beyond the cut-off frequency, the phase shift remains constant at 180° for all frequencies.

Referring to Figure 4a the attenuation obtained in a series derived M-type filter, such as represented in Figure 1 by $Lb$, $Lb$, $Lc$, $Cb$, is shown to be nil up to the cut-off frequency and to increase to infinity at some frequency $f\infty$. Beyond $f\infty$ the attenuation decreases with increase in frequency as shown. In Figure 4b the phase shift per section of the filter is shown to increase with frequency from zero to 180° as the frequency increases from zero to the cut-off frequency $f_c$, and beyond this point the phase shift per section remains constant at 180° to the frequency of infinite attenuation $f\infty$. Beyond $f\infty$ the phase shift per section remains at zero.

As explained hereinbefore, static disturbances are of a very complex nature and difficult to analyze, but the following is offered as a possible explanation of the operation of my invention with respect to certain static effects which may be said to approach a steady state condition, or which appear to approach such condition. Assume that both the filters are low-pass filters having a cut-off frequency above the signal band to be received. From Figures 3b and 4b it will be seen that the signal waves will be shifted in phase in both filters, and in the same direction. By the use of suitable equalizers, or by adjusting the relative lengths of the two filters, the phase shift in the two filters may be made substantially the same, and the two signals will be freely transmitted through both paths to the detector. For static oscillations which are semi-transient in character and approach a steady state condition, all frequencies above $f_c$ transmitted through the filter $La$, $La$, $Ca$ will be shifted in phase 180° per section, while in filter $Lb$, $Lb$, $Lc$, $Cb$ only the frequencies lying between $f_c$ and $f\infty$ will be shifted in phase by this amount, and all frequencies above $f\infty$ will have zero phase shift. Accordingly, in the case of only one section per filter, the oscillations having frequencies above $f\infty$ will be transmitted through the two paths with 180° phase difference, and will therefore neutralize each other. It is obvious that by shifting $f\infty$ towards $f_c$, a greater range of frequencies will be eliminated or neutralized. It will be understood that the curves shown in Figures 3a, 3b, 4a and 4b represent theoretical values obtained from ideal filters having no resistance losses. Conditions obtained in actual practice will vary from those represented by these curves, but in a matter of degree only.

In Figure 5 I have shown a modification of my invention in which Fa and Fb represent the two wave filters connected in parallel transmission paths between the receiving antenna and the output terminals 3 and 4. In this arrangement vacuum tube amplifiers Aa and Ab are connected between the antenna circuit and the input circuits of filters Fa and Fb, respectively. These amplifiers serve to prevent reaction of the antenna circuit upon the two filters, and also to prevent reaction of one filter upon the other. The antenna circuit is rendered aperiodic by resistance R, across which the input circuits of amplifiers Aa and Ab are connected. In a like manner, amplifiers Ac and Ad are connected in the output circuits of filters Fa and Fb, respectively, for the purpose of effectively isolating the filters from each other and preventing interaction through the common output circuit of the two transmission paths. The output circuit of amplifier Ac includes primary winding Pa inductively coupled to the secondary winding S connected to the output terminals 3—4, and primary winding Pb is included in the output circuit of amplifier Ad. The primary windings Pa and Pb are connected in such a manner that the indicial admittances of the two wave filters tend to neutralize or annul each other in the same manner as explained above in connection with Figure 1. R3, R4, R5 and R6 are coupling impedances which may also serve as terminal impedances for filters Fa and Fb. With separate amplifiers in the two transmission paths it is easy to adjust the relative amplitudes of the currents supplied over these paths.

The operation of Figure 5 will be apparent from the foregoing description of the operation of Figure 1. The filters employed at Fa and Fb will have the same characteristics as the filters illustrated in Fig. 1, and various combinations may be employed. For example, the following combinations may be employed:

(a) Two low-pass filters, both passing signal and static;

(b) Two low-pass filters, one having cut-off below signal frequency band and the other above signal frequency band;

(c) One low-pass filter including signal band, and other band elimination filter excluding signal;

(d) One low-pass filter excluding signal, and a band elimination filter with cut-offs between low-pass cut-off and signal band.

Various other combinations of low-pass, high-pass, band pass and band elimination filters may be employed with varying degrees of effectiveness. It is to be noted that while I have described my invention illustrating the use of low-pass filters, high-pass filters may be employed instead, however, the indicial admittances of high-pass filters are somewhat different from that shown in Figure 2. In the case of a high-pass filter the initial frequency of the transient oscillation is higher than the cut-off frequency of the filter and decreases with time, approaching the cut-off frequency as a limit. It is obvious that certain combinations will be best suited for eliminating the relatively low frequency impulsive static, while other combinations will be better adapted for the elimination of the semi-transient form of static which appears to approach steady state conditions. By suitable choice of combination, and specific filter design, it is possible to obtain effective neutralization of both types of static disturbances.

Upon analyzing the operation of my system, it will be seen that the two parallel transmission paths connecting the antenna or collecting network with the detector circuit operate to produce a relative phase shift between transient oscillations established in the two paths by static impulses. The relative phase shift between the two transient oscillations may be considered as being produced by a delay in the transmission along one path or that one path is effectively longer than the other for these transient oscillations.

In the modifications which I have shown and described for the purpose of illustrating my invention, the two transmission paths have been shown as being physically distinct paths connected in parallel, but it is to be understood that my invention contemplates the use of any equivalent arrangement which functions in substantially the same manner, for example, the two parallel transmission paths may be embodied in a single network such as a band pass filter which is equivalent to two parallel branches. It is to be understood therefore, that the term "transmission paths" employed in the accompanying claims is to be interpreted broadly to cover not only physically distinct and independent paths, but also paths which may be embodied in a single network.

What I claim is:

1. In a signaling system, a collector circuit, a detector, two transmission paths connecting said collector circuit and said detector comprising two wave filter networks having substantially complementary indicial admittances.

2. In a signaling system, a collector circuit, a detector, two parallel transmission paths connecting said collector circuit and said detector comprising two wave filters having different indicial admittances and being so adjusted that the transient oscillatory currents in one filter oppose the transient oscillatory currents in the other.

3. In a signaling system, a collector circuit, a detector, two transmission paths connecting said collector circuit with said detector for the transmission of signaling waves, said paths having different indicial admittances and being so adjusted that static effects transmitted over said paths substantially neutralize each other.

4. In a signaling system, a collector circuit, a detector circuit, two transmission paths connecting said collector circuit and said detector circuit in cumulative relation for signaling currents, and means for causing a relative phase displacement of substantially 180 degrees between the oscillatory transient currents produced in said transmission paths by impulse excitation.

5. In a signaling system, a collector circuit, a detector circuit, two transmission paths connecting said collector circuit and said detector circuit, and means comprising a filter network having series and shunt impedances in one of said transmission paths for delaying the transmission of transient currents therethrough by substantially one-half period with respect to the transient currents transmitted through the other path.

6. In a signaling system, a collector circuit, a detector circuit, two transmission paths connecting said collector circuit and said detector circuit, one of said transmission paths comprising a filter network having series and shunt impedances having an effective length greater than the other by substantially one-half wave length of transient oscillations produced in said paths by impulse excitation.

7. In a signaling system, a collector circuit, a detector circuit, two transmission paths connecting said collector circuit and said detector circuit, a wave filter network included in each transmission path, said wave filters having different indicial admittances and different cut-off frequencies.

8. In a signaling system, a collector circuit, a detector circuit, two transmission paths connecting said collector circuit and said detector circuit, a wave filter network having series and shunt impedances included in each of said transmission paths, said wave filters having substantially different effective lengths for oscillatory currents produced in said paths by impulse excitation so that said oscillatory currents substantially neutralize each other at said detector circuit.

9. In a signaling system, a collector circuit, a detector circuit, two transmission paths connecting said collector circuit and said detector circuit, a low-pass filter network in each of said paths, one of said filters having a cut-off frequency above the signal wave band, said filters having different indicial admittances and being so adjusted that the oscillatory effect of one is substantially neutralized by the other.

10. In a signaling system, a collector circuit, a detector circuit, two transmission paths connecting said collector circuit with said detector circuit, a filter network in each of said paths, at least one of said filters passing the signal wave band, one of said transmission paths having an indicial admittance substantially complementary to the indicial admittance of the other transmission path.

11. In a signaling system, a collector circuit, a detector circuit, two transmission paths connecting said collector circuit with said detector circuit, a low-pass constant K type filter in one of said transmission paths having a cut-off frequency above the signaling band, and a filter in the second path having a frequency of infinite attenuation near the cut-off frequency of said first filter.

12. In a signaling system, a collector circuit, a detector circuit, two transmission paths connecting said collector circuit and said detector circuit, a low-pass constant K type filter in one of said transmission paths, and a low-pass series derived M type filter in the second path and having a frequency of infinite attenuation near the cut-off frequency.

13. In a signalling system, a collector circuit, a detector circuit, two transmission paths connecting said collector circuit with said detector circuit for transmitting signalling waves to said detector in cumulative relation, said transmission paths having substantially complementary indicial admittances, whereby the oscillatory effects of static impulses transmitted over said paths substantially neutralize each other.

14. In a signalling system, a collector circuit, a detector circuit, a transmission path connecting said collector with said detector circuit for transmitting signalling waves to said detector circuit, a second transmission path connecting said collector circuit with said detector circuit and having an indicial admittance substantially complementary to the indicial admittance of said first transmission path, whereby the oscillatory effects of static impulses transmitted over said paths substantially neutralize each other.

15. In a signaling system, a collector circuit, a detector circuit, two transmission paths connecting said collector circuit with said detector circuit, a low-pass filter in one of said transmission paths having a cut-off frequency above the signaling band, and a filter in the second path having a frequency of infinite attenuation near the cut-off frequency of said first filter.

PALMER H. CRAIG.